April 11, 1944.  C. J. WAGNER  2,346,630
CORNER MOULDING FOR TRAILER BODIES AND THE LIKE
Filed Jan. 11, 1943
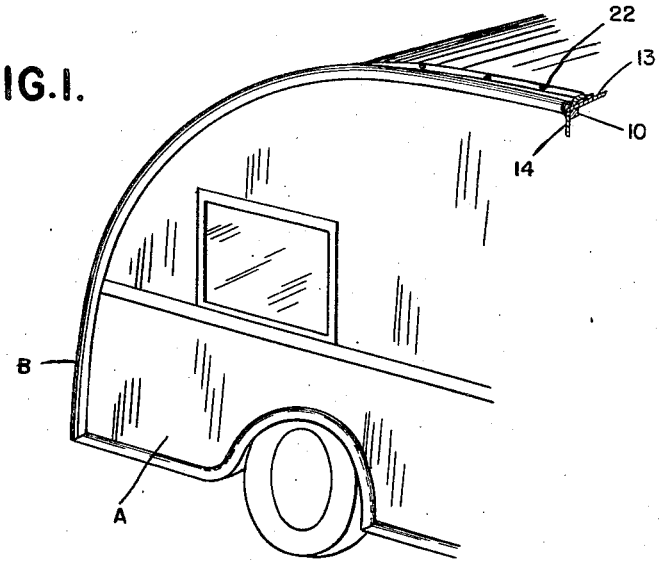
FIG.1.
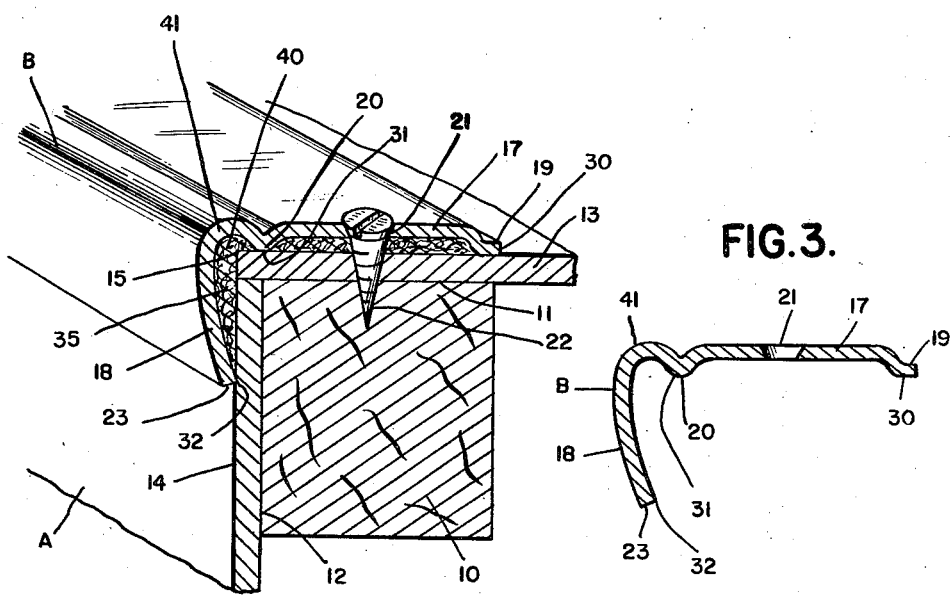
FIG.2.
FIG.3.
INVENTOR.
CARL J. WAGNER
BY
ATTORNEYS Patented Apr. 11, 1944

2,346,630

UNITED STATES PATENT OFFICE 2,346,630

CORNER MOLDING FOR TRAILER BODIES AND THE LIKE

Carl J. Wagner, Detroit, Mich.

Application January 11, 1943, Serial No. 472,041

3 Claims. (Cl. 20—74)

This invention relates generally to corner molding and refers more particularly to molding adapted to be applied to corners of trailer bodies and the like.

One of the essential objects of the invention is to provide a molding that curves smoothly around corners such as roof edges and wheel openings of the trailer bodies and transforms right angular corners into smooth rounded corners.

Another object is to provide a molding that constitutes a strapping binder for the corners to which it is applied and has two longitudinally connected legs that provide adequate clearance at the corners to compensate for any irregularities in the construction and formation of the corners themselves.

Another object is to provide a molding that has a three-point contact with the corner structure to which it is applied and has provision between the three contact points for receiving and trapping a body of waterproof caulking compound so that a positive seal against leakage is obtained.

Another object is to provide a molding wherein two of the three points mentioned are spaced laterally apart in one leg of the molding to permit the reception between said points of suitable attaching elements such as screws, nails and the like.

Another object is to provide a molding wherein the third contact point is at the longitudinal free edge of the other leg of the molding and is adapted to bear firmly against or bite into the corner structure when the attaching elements aforesaid are driven home, especially if such elements are driven at a slight angle tending to draw the longitudinal edge mentioned against the corner structure.

Another object is to provide a molding that is simple in construction, economical to manufacture and easy to install.

Other objects, advantages and novel details of construction of this invention will be made more apparent as this description proceeds, especially when considered in connection with the accompanying drawing, wherein:

Figure 1 is a fragmentary perspective view of a trailer and showing a molding embodying my invention;

Figure 2 is a cross sectional perspective view through a corner of the trailer body and showing molding embodying my invention applied thereto;

Figure 3 is a cross sectional view through the molding per se.

Referring now to the drawing, A is the body of a trailer, and B is a molding embodying my invention applied thereto.

As shown, the body A of the trailer has a frame member 10 provided with right angular sides 11 and 12, respectively, and is provided with sheathing 13 and 14, respectively, which overlaps said sides 11 and 12 in surface to surface relation and provides a right angular corner 15.

The molding B for covering the corner 15 is preferably in strip form and has two longitudinally connected legs 17 and 18, respectively, that are disposed at substantially right angles to each other and overlie the sheathing 13 and 14.

Preferably the leg 17 is substantially flat except for two laterally spaced longitudinally extending inwardly pressed embossments 19 and 20, respectively, and is provided at spaced points longitudinally thereof between the embossments with suitable openings 21 for attaching elements 22 such as screws, nails and the like. The other leg 18 is transversely curved from its longitudinal free edge 23 to the outer side of the embossment 20 so as to provide a rounded covering for the right angular corner 15 of the trailer body when the molding is applied thereto as illustrated in Figure 1. In fact the construction of the molding is such that a three-point contact at 30, 31 and 32, respectively, is provided with the corner structure. Thus, waterproof caulking material such as 35 may be received and trapped between the three contact points 30, 31 and 32 as in Figure 2 to provide a positive weather-tight seal between both legs 17 and 18 of the molding and the corner structure of the trailer body. When the screws 22 or other attaching elements are applied, the longitudinal edge 23 of the molding will be drawn firmly against the sheathing 14 to provide a tight joint. In fact the longitudinal edge 23 of the molding may be made to bite into the sheathing 14 if this is desired by simply driving in the attaching elements 22 at an angle to pull or draw the leg 18 bodily inward against the corner structure. Thus, the construction is such that one set of attaching elements 22 in the leg 17 will suffice to hold the entire molding in proper assembled relation with the corner structure of the trailer body to obtain the results desired.

By referring to Figure 2 it will be noted that clearance 40 is provided between the crown portion 41 of the curved leg 18 and the right angular corner 15, hence the molding will compensate for any irregularities in the construction or formation of the corner itself and will provide a desirable smooth rounded cover therefor.

What I claim as my invention is:

1. A corner molding assembly comprising a strip of sheet material having two longitudinally connected leg portions disposed at substantially right angles to each other so as to overlie two faces forming a corner of an article, one of said leg portions being substantially flat except for two laterally spaced longitudinally extending inwardly pressed embossments for contact with one of the faces aforesaid and provided at spaced points longitudinally thereof between said embossments with openings for attaching elements, the other leg portion being transversely curved from its longitudinal free edge to the outer side of one of the embossments aforesaid so as to provide a rounded covering for the corner formed by the two faces mentioned, and waterproof caulking material received in the spaces between and held against displacement by the laterally spaced embossments and the free edge aforesaid to provide a weathertight seal between both leg portions of the strip and the two faces forming the corner aforesaid.

2. A corner molding assembly comprising a strip of sheet material having two longitudinally connected leg portions disposed at substantially right angles to each other so as to overlie two faces forming a corner of an article, one of said leg portions being substantially flat except for two laterally spaced longitudinally extending inwardly pressed embossments for contact with one of the faces aforesaid and provided at spaced points longitudinally thereof between said embossments with openings for attaching elements, the other leg portion being shaped to overlie the other of the two faces mentioned and having a free edge engageable with said other face, and waterproof caulking material received in the spaces between and held against displacement by the laterally spaced embossments and the free edge aforesaid to provide a weather-tight seal between both leg portions of the strip and the two faces forming the corner aforesaid.

3. A corner molding assembly comprising a strip of sheet material having two longitudinally connected leg portions disposed at substantially right angles to each other so as to overlie two faces forming a corner of an article, one of said leg portions being substantially flat except for two laterally spaced longitudinally extending inwardly pressed embossments for contact with one of the faces aforesaid and provided at spaced points longitudinally thereof between said embossments with openings for attaching elements, the other leg portion being transversely curved from its longitudinal free edge to the outer side of one of the embossments aforesaid so as to provide a rounded covering for the corner formed by the two faces mentioned.

CARL J. WAGNER.